(12) United States Patent
Gyoda

(10) Patent No.: US 10,025,075 B2
(45) Date of Patent: Jul. 17, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Yuichi Gyoda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/447,830

(22) Filed: Mar. 2, 2017

(65) Prior Publication Data

US 2017/0254991 A1 Sep. 7, 2017

(30) Foreign Application Priority Data

Mar. 7, 2016 (JP) .................. 2016-043134

(51) Int. Cl.
*G02B 27/64* (2006.01)
*G02B 15/16* (2006.01)

(52) U.S. Cl.
CPC ........... *G02B 15/16* (2013.01); *G02B 27/646* (2013.01)

(58) Field of Classification Search
CPC ........ G02B 15/00–15/28; G02B 27/64–27/648
USPC ................................................. 359/554–557
See application file for complete search history.

(56) References Cited

U.S. PATENT DOCUMENTS

| | | | | |
|---|---|---|---|---|
| 5,760,957 A * | 6/1998 | Suzuki | ................. | G02B 15/173 359/554 |
| 6,226,122 B1 * | 5/2001 | Sugawara | .............. | G02B 13/02 359/407 |
| 8,238,040 B2 * | 8/2012 | Miwa | ................... | G02B 15/173 359/554 |
| 8,878,982 B2 * | 11/2014 | Abe | ...................... | G02B 15/173 348/340 |
| 9,086,562 B2 * | 7/2015 | Hosoi | .................. | G02B 15/173 |
| 9,817,218 B2 * | 11/2017 | Hosoi | ................. | G02B 27/646 |
| 2013/0242166 A1 * | 9/2013 | Hosoi | ................. | G02B 15/173 348/345 |
| 2016/0116734 A1 | 4/2016 | Gyoda | | |

FOREIGN PATENT DOCUMENTS

| | | |
|---|---|---|
| JP | H07-27978 A | 1/1995 |
| JP | 2001-249276 A | 9/2001 |
| JP | 2012-141598 A | 7/2012 |

* cited by examiner

*Primary Examiner* — William R Alexander
*Assistant Examiner* — Jeffrey Madonna
(74) *Attorney, Agent, or Firm* — Carter, DeLuca, Farrell & Schmidt LLP

(57) ABSTRACT

A zoom lens includes positive first, negative second, positive third units, and rear group. An interval between first and second units is larger and that between second and third units is smaller at telephoto end (TE) than at wide angle end. Second unit or a negative sub-unit corresponding to a part of second unit serves as first image stabilizing (IS) unit moving during image blur correction in a direction having a component in a direction perpendicular to optical axis. A negative sub-unit corresponding to a part of third unit or a negative unit included in rear group serves as second IS unit. A distance from a surface closest to object side of first IS unit to image plane at TE, a distance from a surface closest to object side of second IS unit to image plane at TE, and focal length of the zoom lens at TE are appropriately set.

14 Claims, 13 Drawing Sheets

FIG. 1A
WIDE ANGLE END
FIG. 1B
TELEPHOTO END
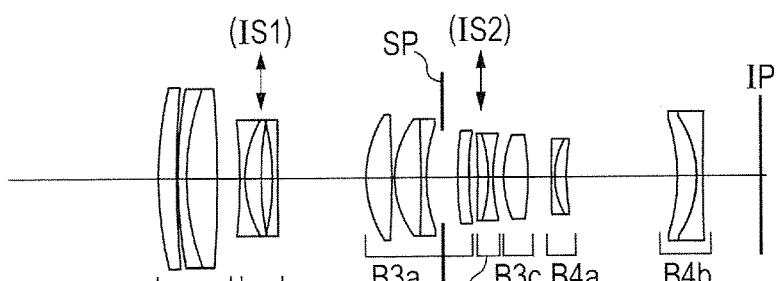
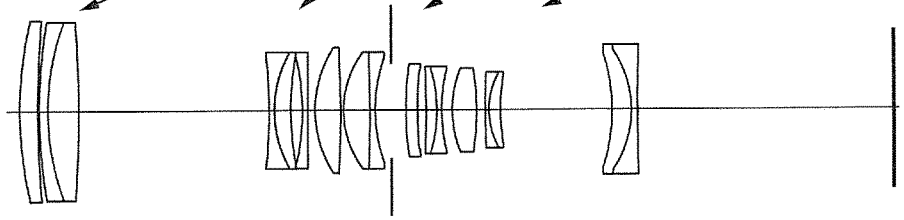

FIG. 7
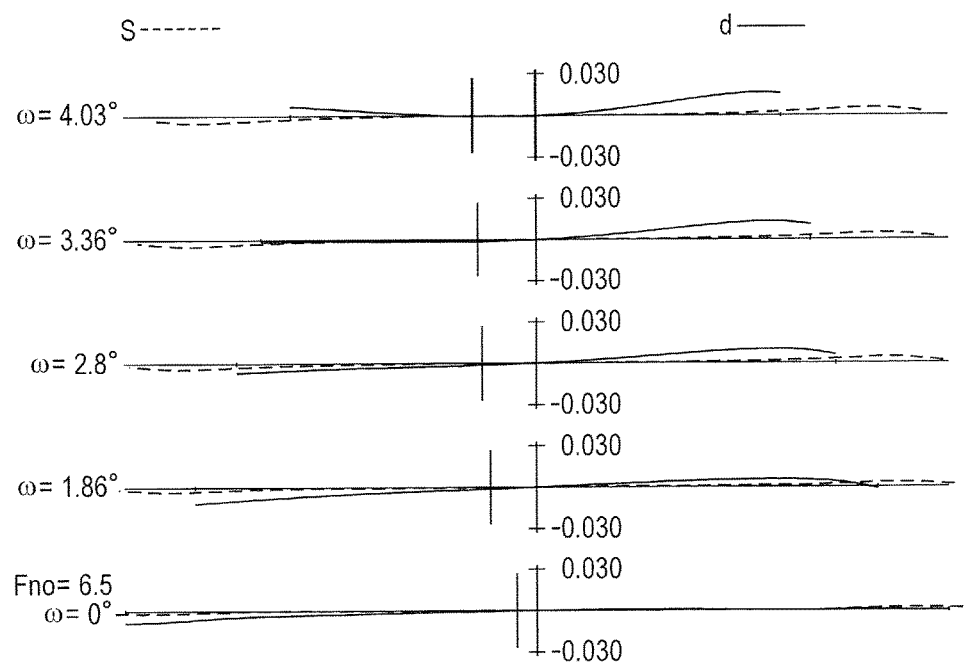
FIG. 8A
WIDE ANGLE END
FIG. 8B
TELEPHOTO END
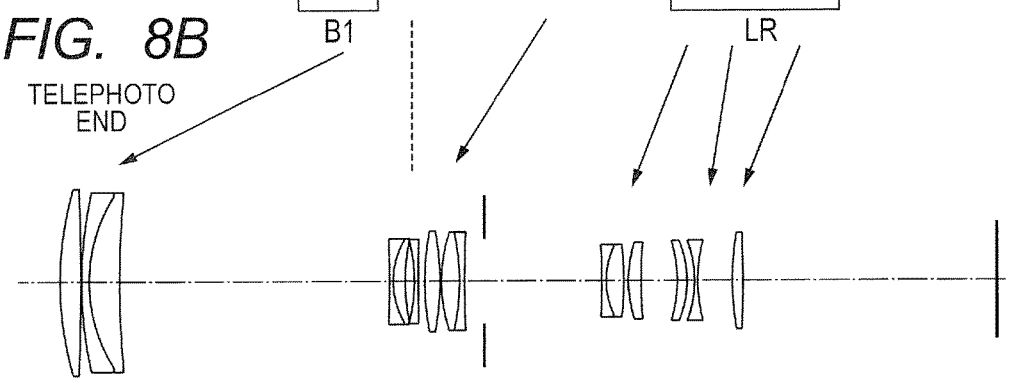

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup optical system used in an image pickup apparatus, for example, a digital camera, a video camera, a TV camera, a monitoring camera, or a silver-halide film camera.

Description of the Related Art

In recent years, as image pickup optical systems that are used in image pickup apparatus each using a solid-state image pickup element, there is a demand for zoom lenses that are small as a whole and have a high zoom ratio and high optical characteristics over an entire zoom range thereof. Further, such image pickup optical systems are demanded to be zoom lenses having an image stabilization mechanism configured to correct an image blur. In general, an image stabilizing unit is configured to move during image blur correction in a direction perpendicular to an optical axis. When the image stabilizing unit is moved in the direction perpendicular to the optical axis, decentering aberration is generated.

There has hitherto been known a zoom lens in which a plurality of image stabilizing units are configured to move in a direction perpendicular to an optical axis in order to reduce decentering aberration that is generated during image blur correction. In Japanese Patent Application Laid-Open No. 2001-249276, there is disclosed a five-unit zoom lens including, in order from an object side to an image side, a first lens unit to a fifth lens unit having positive, negative, positive, negative, and positive refractive powers, respectively, in which the second lens unit and the fourth lens unit are configured to move during image blur correction in a direction perpendicular to an optical axis.

In Japanese Patent Application Laid-Open No. H07-27978, there is disclosed a four-unit zoom lens including, in order from an object side to an image side, a first lens unit to a fourth lens unit having positive, negative, negative, and positive refractive powers, respectively, in which the third lens unit and the fourth lens unit are configured to move during image blur correction in a direction perpendicular to an optical axis. In Japanese Patent Application Laid-Open No. 2012-141598, there is disclosed a four-unit zoom lens including, in order from an object side to an image side, a first lens unit to a fourth lens unit having positive, negative, positive, and negative refractive powers, respectively, in which a plurality of image stabilizing units defined in the fourth lens unit are configured to move in a direction perpendicular to an optical axis.

There is a demand for a zoom lens having an image stabilization function in which, during image blur correction, the amount of decentering aberration is small, and satisfactory optical characteristics may be maintained.

In general, in order to provide a large image stabilization angle, it is necessary to greatly decenter an image stabilizing unit (increase the decentering amount thereof), or to increase image stabilization sensitivity. When the decentering amount of the image stabilizing unit is increased, in general, decentering aberration is greatly generated as well to reduce optical characteristics. Further, in order to enhance the image stabilization sensitivity of the image stabilizing unit, it is generally necessary to increase a refractive power of the image stabilizing unit. However, with the increased refractive power, decentering aberration is greatly generated during decentering to reduce the optical characteristics.

In order to reduce aberration variations during image blur correction while ensuring a large image stabilization angle, it is important to appropriately set the lens configuration of a zoom lens, the number of image stabilizing units for image blur correction, the lens configuration of each image stabilizing unit, and the like. If an image stabilizing unit configured to move for image blur correction is not appropriately selected or the lens configuration of an image stabilizing unit is not appropriately determined, a large image stabilization angle is not obtained, that is, image blur correction is not sufficiently performed. In addition, the amount of decentering aberration that is generated during image stabilization is increased, leading to difficulty in maintaining high optical characteristics during image stabilization.

SUMMARY OF THE INVENTION

It is an object of the present invention to provide a zoom lens capable of providing a large image stabilization angle, and maintaining satisfactory optical characteristics even during image blur correction, and an image pickup apparatus including the zoom lens.

According to one embodiment of the present invention, there is provided a zoom lens, comprising, in order from an object side to an image side:

a first lens unit having a positive refractive power;
a second lens unit having a negative refractive power;
a third lens unit having a positive refractive power; and
a rear lens group including one or more lens units, in which an interval between each pair of adjacent lens units is changed during zooming, in which an interval between the first lens unit and the second lens unit is larger at a telephoto end than at a wide angle end, and an interval between the second lens unit and the third lens unit is smaller at the telephoto end than at the wide angle end, in which one of the entire second lens unit and a lens sub-unit having a negative refractive power, which corresponds to a part of the second lens unit, serves as a first image stabilizing unit configured to move during image blur correction in a direction having a component in a direction perpendicular to an optical axis, in which one of a lens sub-unit having a negative refractive power, which corresponds to a part of the third lens unit, and a lens unit having a negative refractive power, which is included in the rear lens group, serves as a second image stabilizing unit configured to move during image blur correction in a direction having a component in a direction perpendicular to the optical axis, and in which the following conditional expressions are satisfied:

$$0.2 < D1t/fT < 0.65; \text{ and}$$

$$0.2 < D2t/fT < 0.65,$$

where $D1t$ represents a distance from a lens surface closest to the object side of the first image stabilizing unit to an image plane at the telephoto end, $D2t$ represents a distance from a lens surface closest to the object side of the second image stabilizing unit to the image plane at the telephoto end, and $fT$ represents a focal length of the zoom lens at the telephoto end.

Further features of the present invention will become apparent from the following description of exemplary embodiments with reference to the attached drawings.

BRIEF DESCRIPTION OF THE DRAWINGS

FIG. 1A is a lens cross-sectional view of a zoom lens at a wide angle end according to Example 1 of the present invention.

FIG. 1B is a lens cross-sectional view of the zoom lens at a telephoto end according to Example 1 of the present invention.

FIG. 7 is lateral aberration diagrams of the zoom lens at the telephoto end when the image stabilization is performed with both of the second lens unit B2 and the second lens sub-unit B3$b$ according to Example 1 of the present invention.

FIG. 8A is a lens cross-sectional view of a zoom lens at a wide angle end according to Example 2 of the present invention.

FIG. 8B is a lens cross-sectional view of the zoom lens at a telephoto end according to Example 2 of the present invention.

DESCRIPTION OF THE EMBODIMENTS

Figure 2A:
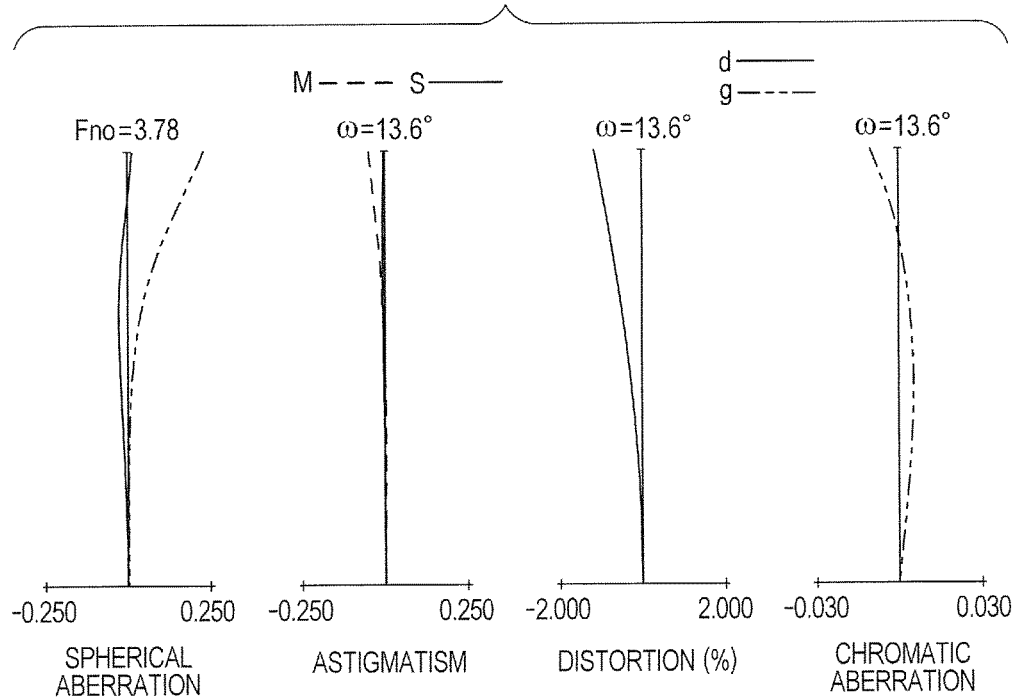
FIG. 2A is longitudinal aberration diagrams of the zoom lens at the wide angle end according to Example 1 of the present invention.

Now, exemplary embodiments of the present invention are described in detail with reference to the attached drawings. A zoom lens of the present invention includes, in order from an object side to an image side, a first lens unit having a positive refractive power, a second lens unit having a negative refractive power, a third lens unit having a positive refractive power, and a rear lens group including one or more lens units. Further, an interval between each pair of adjacent lens units is changed during zooming. At this time, an interval between the first lens unit and the second lens unit is larger at a telephoto end than at a wide angle end, and an interval between the second lens unit and the third lens unit is smaller at the telephoto end than at the wide angle end.

FIG. 1A and FIG. 1B are lens cross-sectional views of a zoom lens at the wide angle end and the telephoto end, respectively according to Example 1 of the present invention. FIG. 2A to FIG. 7 are aberration diagrams related to the zoom lens according to Example 1 of the present invention. FIG. 8A and FIG. 8B are lens cross-sectional views of a zoom lens at the wide angle end and the telephoto end, respectively according to Example 2 of the present invention. FIG. 9A to FIG. 14 are aberration diagrams related to the zoom lens according to Example 2 of the present invention. FIG. 15 is a schematic view of a main part of an image pickup apparatus of the present invention. The zoom lens of the present invention is used in an image pickup apparatus, for example, a digital camera, a video camera, or a silver-halide film camera.

In the lens cross-sectional views, the left side corresponds to the object side and the right side corresponds to the image side. In the lens cross-sectional views, the order of each lens unit from the object side to the image side is represented by i, and an i-th lens unit is represented by Bi. A rear lens group LR includes one or more lens units. In the lens cross-sectional views, a first lens sub-unit B3a, a second lens sub-unit B3b, a third lens sub-unit B3c, a 4a-th lens sub-unit B4a, and a 4b-th lens sub-unit Bob are illustrated. A first image stabilizing unit IS1 is configured to move during image blur correction in a direction having a component in a direction perpendicular to an optical axis. A second image stabilizing unit IS2 is configured to move during image blur correction in the direction having the component in the direction perpendicular to the optical axis.

An f-number determination member (hereinafter referred to also as "aperture stop") SP has a function of an aperture stop for determining (limiting) a minimum f-number (Fno) light flux. As an image plane IP, an image pickup plane of an image pickup element (photo-electric conversion element), for example, a CCD sensor or a CMOS sensor, is arranged when the zoom lens is used as a photographing optical system of a video camera or a digital still camera. Alternatively, a photosensitive surface corresponding to a film surface is arranged when the zoom lens is used as a photographing optical system of a silver-halide film camera.

Of the aberration diagrams, in the spherical aberration diagrams, the solid line indicates a d-line (wavelength: 587.6 nm), and the two-dot chain line indicates a g-line (wavelength: 435.8 nm). In the astigmatism diagrams, the dotted line indicates a meridional image plane, and the solid line indicates a sagittal image plane. The lateral chromatic aberration is shown by the g-line. In the lateral aberration diagrams, aberration diagrams of the d-line at image heights of a half angle of view ($\omega$) (degrees) are shown. The broken line indicates the sagittal image plane, and the solid line indicates the meridional image plane. Symbol Fno represents an f-number. The half angle of view $\omega$ represents a value in terms of a ray tracing value. In the lens cross-sectional views, the arrows indicate movement loci of the respective lens units from the wide angle end to the telephoto end during zooming.

In Examples described below, the wide angle end and the telephoto end respectively refer to the zoom positions when a variable power lens unit is located at both ends of a mechanically movable range thereof on an optical axis.

The zoom lens of the present invention includes, in order from the object side to the image side, a first lens unit B1 having a positive refractive power, a second lens unit B2 having a negative refractive power, a third lens unit B3 having a positive refractive power, and the rear lens group LR including one or more lens units.

The entire second lens unit B2 or a lens sub-unit having a negative refractive power, which includes a part of lenses included in the second lens unit B2, forms the first image stabilizing unit IS1 configured to move during image blur correction in the direction having the component in the direction perpendicular to the optical axis. Further, the lens sub-unit B3b having a negative refractive power, which includes a part of lenses included in the third lens unit B3, or a lens unit having a negative refractive power included in the rear lens group LR forms the second image stabilizing unit IS2 configured to move during image blur correction in the direction having the component in the direction perpendicular to the optical axis.

In addition, a distance from a lens surface closest to the object side of the first image stabilizing unit IS1 to an image plane at the telephoto end is represented by D1t. A distance from a lens surface closest to the object side of the second image stabilizing unit IS2 to the image plane at the telephoto end is represented by D2t. A focal length of the zoom lens at the telephoto end is represented by fT. In this case, the following conditional expressions are satisfied:

$$0.2 < D1t/fT < 0.65 \quad (1X); \text{ and}$$

$$0.2 < D2t/fT < 0.65 \quad (1Y).$$

Next, the technical meanings of the above-mentioned conditional expressions are described. When the value exceeds the upper limit of Conditional Expression (1X) or (1Y), an axial light flux and an off-axial light flux that pass through the first image stabilizing unit IS1 and the second image stabilizing unit IS2 are separated from each other, leading to difficulty in satisfactorily correcting decentering field curvature that is generated during image stabilization (during decentering). On the other hand, when the value falls below the lower limit of Conditional Expression (1X) or (1Y), the first image stabilizing unit IS1 and the second image stabilizing unit IS2 are too close to the image plane, and hence the effective diameter of the axial light flux is small. When the effective diameter of the axial light flux is small, image stabilization sensitivity tends to be small, leading to difficulty in increasing an image stabilization angle.

Thus, through satisfaction of Conditional Expressions (1X) and (1Y), the image stabilization angle is easily increased, and satisfactory optical characteristics are easily maintained during image stabilization. As described above, the zoom lens of each Example has excellent optical characteristics when image stabilization is not performed, and easily provides satisfactory optical characteristics even under a state in which the image stabilization angle is large. It is more preferred to set the numerical ranges of Conditional Expressions (1X) and (1Y) as follows:

$$0.3 < D1t/fT < 0.60 \quad (1Xa); \text{ and}$$

$$0.25 < D2t/fT < 0.55 \quad (1Ya).$$

In each Example, it is more preferred to satisfy one or more of the following conditional expressions. A focal length of the first image stabilizing unit IS1 is represented by fIS1. A focal length of the second image stabilizing unit IS2 is represented by fIS2. A combined focal length of all lens systems arranged on the object side of the first image stabilizing unit IS1 at the telephoto end is represented by fIS1f. A combined focal length of all lens systems arranged on the object side of the second image stabilizing unit IS2 at the telephoto end is represented by fIS2f.

In this case, it is preferred to satisfy one or more of the following conditional expressions:

$$0.05 < |fIS1/fT| < 0.25 \quad (2X);$$

$$0.05 < |fIS2/fT| < 0.25 \quad (2Y);$$

$$|fIS1f/fT| < 2.0 \quad (3X); \text{ and}$$

$$|fIS2f/fT| < 2.0 \quad (3Y).$$

Next, the technical meanings of the above-mentioned conditional expressions are described. When the value exceeds the upper limit of Conditional Expression (2X) or (2Y), the negative refractive powers of the first image stabilizing unit IS1 and the second image stabilizing unit IS2 are too weak (absolute values of negative refractive powers are too small), leading to difficulty in increasing the image stabilization sensitivity, and increasing the image stabilization angle.

On the other hand, when the value falls below the lower limit of Conditional Expression (2X) or (2Y), the negative refractive powers of the first image stabilizing unit IS1 and the second image stabilizing unit IS2 are too strong (absolute values of negative refractive powers are too large), leading to difficulty in reducing decentering coma and the like during image stabilization. Thus, through satisfaction of Conditional Expressions (2X) and (2Y), the image stabilization angle is easily increased, and satisfactory optical characteristics are easily maintained during image stabilization.

When the value falls below the lower limit of Conditional Expression (3X) or (3Y), an incident angle of a light beam entering the first image stabilizing unit IS1 and the second image stabilizing unit IS2 is too large, leading to difficulty in reducing decentering field curvature and decentering coma during image stabilization. Thus, through satisfaction of Conditional Expressions (3X) and (3Y), satisfactory optical characteristics are easily maintained during image stabilization. It is more preferred to set the numerical ranges of Conditional Expressions (2) and (3) as follows.

$$0.07 < |fIS1/fT| < 0.15 \quad (2Xa)$$

$$0.10 < |fIS2/fT| < 0.23 \quad (2Ya)$$

$$0.3 < |fIS1f/fT| < 1.5 \quad (3Xa)$$

$$0.3 < |fIS2f/fT| < 1.5 \quad (3Ya)$$

Next, a preferred lens configuration in the present invention is described. It is preferred that each of the first image stabilizing unit IS1 and the second image stabilizing unit IS2 include two or three lenses. For example, it is preferred that the first image stabilizing unit IS1 consist of, in order from the object side to the image side, a cemented lens obtained by cementing a negative lens and a positive lens, and a negative lens. Further, it is preferred that the second image stabilizing unit IS2 consist of, in order from the object side to the image side, a positive lens and a negative lens.

When each of the first image stabilizing unit IS1 and the second image stabilizing unit IS2 includes one lens, chromatic aberration (especially chromatic decentering coma) is greatly generated during decentering. Further, when each of the first image stabilizing unit IS1 and the second image stabilizing unit IS2 includes four or more lenses, the weight of each image stabilizing unit is increased, and a mechanism configured to perform decentering during image stabilization is therefore upsized. With the large mechanism configured to perform decentering, it is difficult to greatly decenter the image stabilizing units, resulting in difficulty in increasing the image stabilization angle. Thus, each of the first image stabilizing unit IS1 and the second image stabilizing unit IS2 includes two or three lenses such that the image stabilization angle is easily increased while satisfactory image quality is maintained during image stabilization.

It is preferred that an aperture stop SP having a variable aperture diameter be arranged between the first image stabilizing unit IS1 and the second image stabilizing unit IS2. In other words, it is preferred that one of the first image stabilizing unit IS1 and the second image stabilizing unit IS2 be arranged on the object side of the aperture stop SP, and the other be arranged on the image side thereof. The image stabilizing unit having a negative refractive power, which is arranged on the object side of the aperture stop SP, and the image stabilizing unit having a negative refractive power, which is arranged on the image side thereof, are simultaneously decentered in the same direction such that distortion that is generated during decentering may be corrected and an uneven light quantity ratio may be easily suppressed. Thus, satisfactory optical characteristics are more easily maintained by arranging one of the first image stabilizing unit IS1 and the second image stabilizing unit IS2 in front of the aperture stop SP, and the other behind the aperture stop SP.

Described next is the reason why the configuration of Example 1 or 2 is preferably employed in order to provide a zoom lens having excellent optical characteristics even under a state in which an image stabilization angle is large.

<Second Lens Unit B2 Having Negative Refractive Power>

In Example 1 (also in Example 2 described later), the second lens unit B2 having a negative refractive power serves as the first image stabilizing unit IS1. It has been known that, in order to reduce decentering field curvature during image stabilization (during decentering) in a positive lead type (a zoom lens type in which a lens unit closest to an object side has a positive refractive power), a lens sub-unit having a negative refractive power is suitable for an image stabilizing unit. In addition, the lens unit having a negative refractive power is suitable for the image stabilizing unit in terms of downsizing of a zoom lens because a mechanism configured to decenter the image stabilizing unit may be reduced in size.

Further, it is necessary to enhance image stabilization sensitivity in order to reduce the decentering amount of one image stabilizing unit while increasing an image stabilization angle. The image stabilization sensitivity is substantially proportional to the height of an axial light beam. The diameter of an axial light flux at the second lens unit B2 of the positive lead type is large, and hence the second lens unit B2 is suitable for the image stabilizing unit.

<Second Lens Sub-Unit B3b Having Negative Refractive Power and Fifth Lens Unit B5 Having Negative Refractive Power>

In Example 1, the second lens sub-unit B3b having a negative refractive power (in Example 2, a fifth lens unit B5 having a negative refractive power) serves as the second image stabilizing unit IS2. The reason why the lens unit having a negative refractive power is preferably used as the second image stabilizing unit IS2 is as described above. In addition, lens sub-units (lens units) having negative refractive powers perform image stabilization to each other such that aberration (decentering aberration) that is generated in each image stabilizing unit is easily reduced.

In the present invention, field curvature that is generated when the first image stabilizing unit IS1 is decentered, and field curvature that is generated when the second image stabilizing unit IS2 is decentered in the same direction as the first image stabilizing unit IS1 have a relationship of correcting each other. Thus, the two image stabilizing units having negative refractive powers simultaneously perform image stabilization such that satisfactory optical characteristics are maintained even when the image stabilization angle is large.

Next, the lens configuration of the zoom lens of each Example is described.

Example 1

The zoom lens according to Example 1 of the present invention illustrated in FIG. 1A and FIG. 1B is described. The zoom lens of Example 1 has the following lens configuration in which the lens units are arranged in order from the object side to the image side. The zoom lens of Example 1 includes the first lens unit B1 having a positive refractive power, the second lens unit B2 having a negative refractive power, the third lens unit B3 having a positive refractive power, and the rear lens group LR. The rear lens group LR consists of a fourth lens unit B4 having a negative refractive power.

The third lens unit B3 consists of, in order from the object side to the image side, three lens sub-units, that is, the first lens sub-unit B3a having a positive refractive power, the second lens sub-unit B3b having a negative refractive power, and the third lens sub-unit B3c having a negative refractive power. Further, the fourth lens unit B4 includes, in order from the object side to the image side, two lens sub-units, that is, the 4a-th lens sub-unit B4a having a negative refractive power and the 4b-th lens sub-unit Bob having a negative refractive power, between which the largest air interval is provided as a boundary. An interval between each pair of adjacent lens units is changed during zooming.

All of the lens units are configured to move toward the object side along loci different from each other during zooming from the wide angle end to the telephoto end. An interval between the first lens unit B1 and the second lens unit B2 is larger at the telephoto end than at the wide angle end, an interval between the second lens unit B2 and the third lens unit B3 is smaller at the telephoto end than at the wide angle end, and an interval between the third lens unit B3 and the fourth lens unit B4 is smaller at the telephoto end than at the wide angle end. All of the first lens sub-unit B3a, the second lens sub-unit B3b, and the third lens sub-unit B3c are configured to move along the same locus during zooming. Similarly, the 4a-th lens sub-unit B4a and the 4b-th lens sub-unit Bob are configured to move along the same locus during zooming. Focusing is performed with the 4a-th lens sub-unit B4a.

Figure 2B:
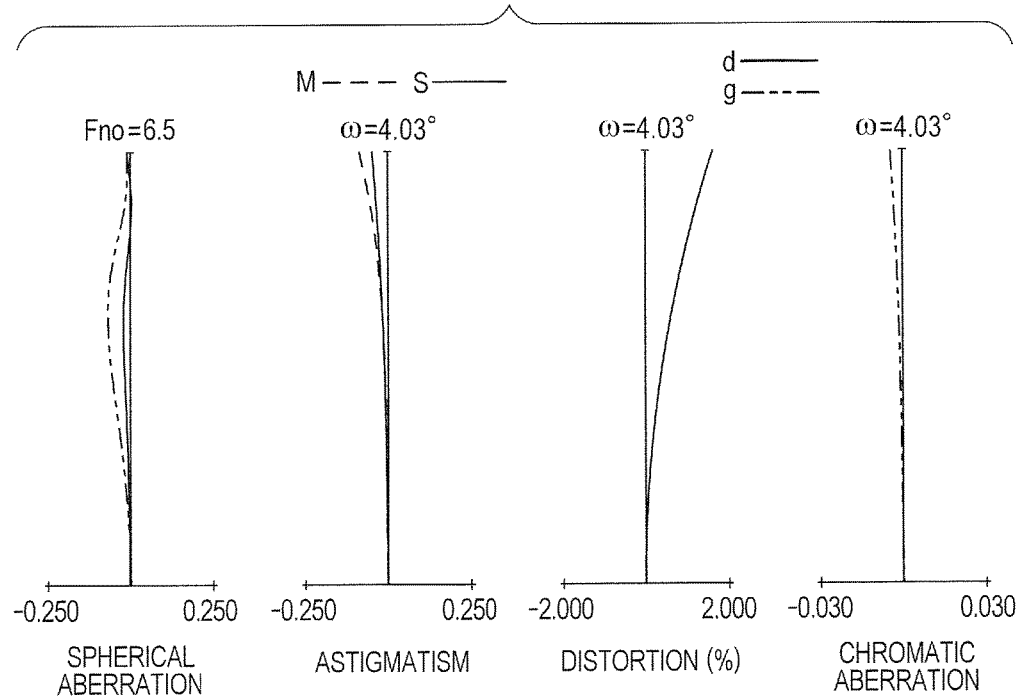
FIG. 2B is longitudinal aberration diagrams of the zoom lens at the telephoto end according to Example 1 of the present invention.
Figure 3A:
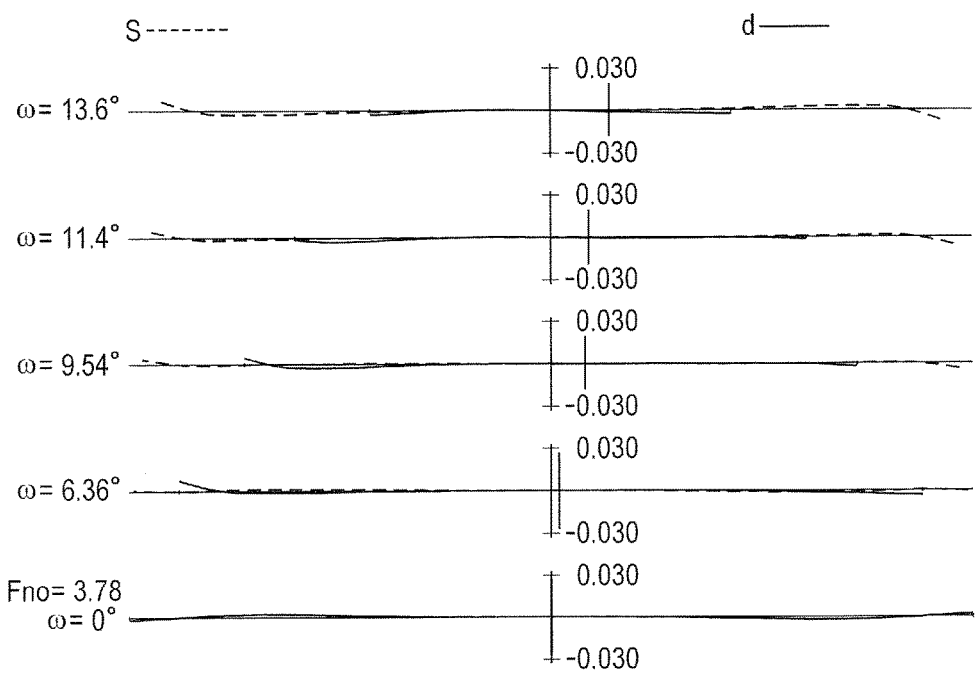
FIG. 3A is lateral aberration diagrams of the zoom lens at the wide angle end according to Example 1 of the present invention.
Figure 3B:
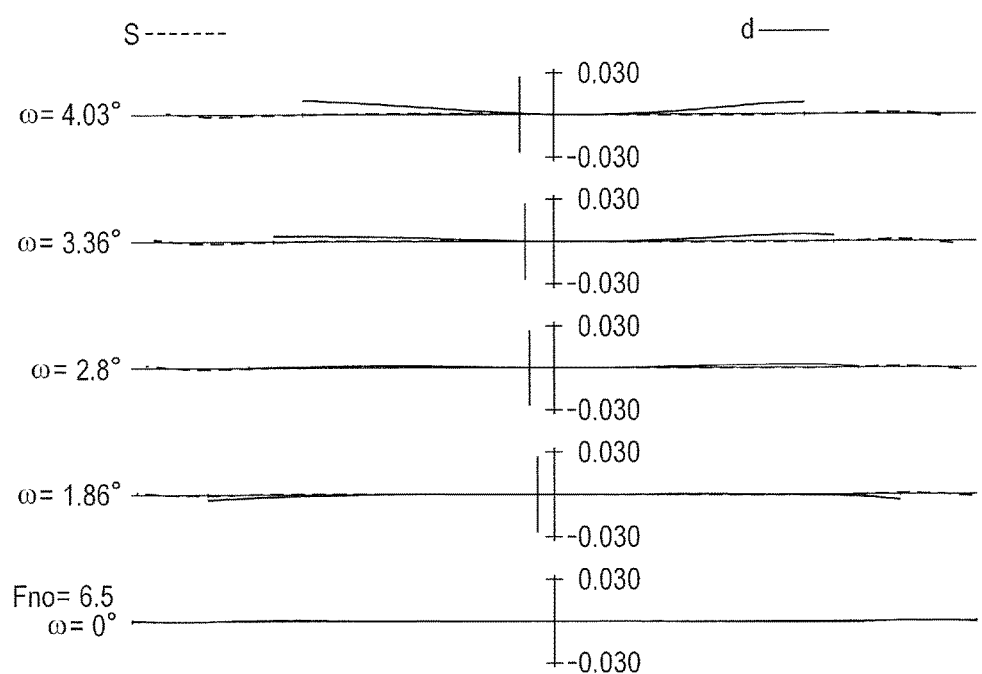
FIG. 3B is lateral aberration diagrams of the zoom lens at the telephoto end according to Example 1 of the present invention.

FIG. 2A and FIG. 2B are longitudinal aberration diagrams of the zoom lens at the wide angle end and the telephoto end, respectively according to Example 1 of the present invention. FIG. 3A and FIG. 3B are lateral aberration diagrams at the wide angle end and the telephoto end, respectively according to the zoom lens of Example 1. As shown in FIG. 2A, FIG. 2B, FIG. 3A, and FIG. 3B, the zoom lens of Example 1 has satisfactory optical characteristics also when image stabilization is not performed.

In Example 1, the second lens unit B2 serves as the first image stabilizing unit IS1, and the second lens sub-unit B3b serves as the second image stabilizing unit IS2. When the zoom lens vibrates, the image stabilizing units are moved in the direction having the component in the direction perpendicular to the optical axis (are decentered) such that the range of a light beam that enters an image pickup element is changed. In short, image blur correction is performed. In the following, an image stabilization angle refers to an angle formed by an axis connecting an object point and the center of the optical axis on the lens surface closest to the object side before image stabilization, and an axis connecting an object point and the center of the optical axis on the lens surface closest to the object side during image stabilization. Further, image stabilization sensitivity refers to an image stabilization angle formed when the image stabilizing units are moved by 1 mm in the direction perpendicular to the optical axis.

Figure 4A:
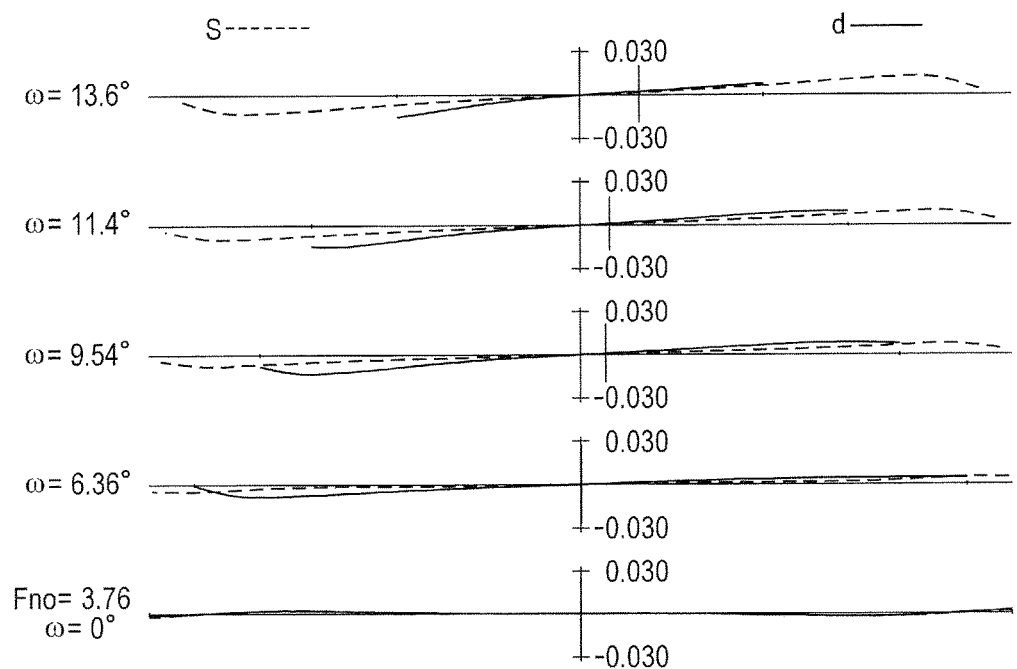
FIG. 4A is lateral aberration diagrams of the zoom lens at the wide angle end when an image stabilization is performed with a second lens unit B2 according to Example 1 of the present invention.
Figure 4B:
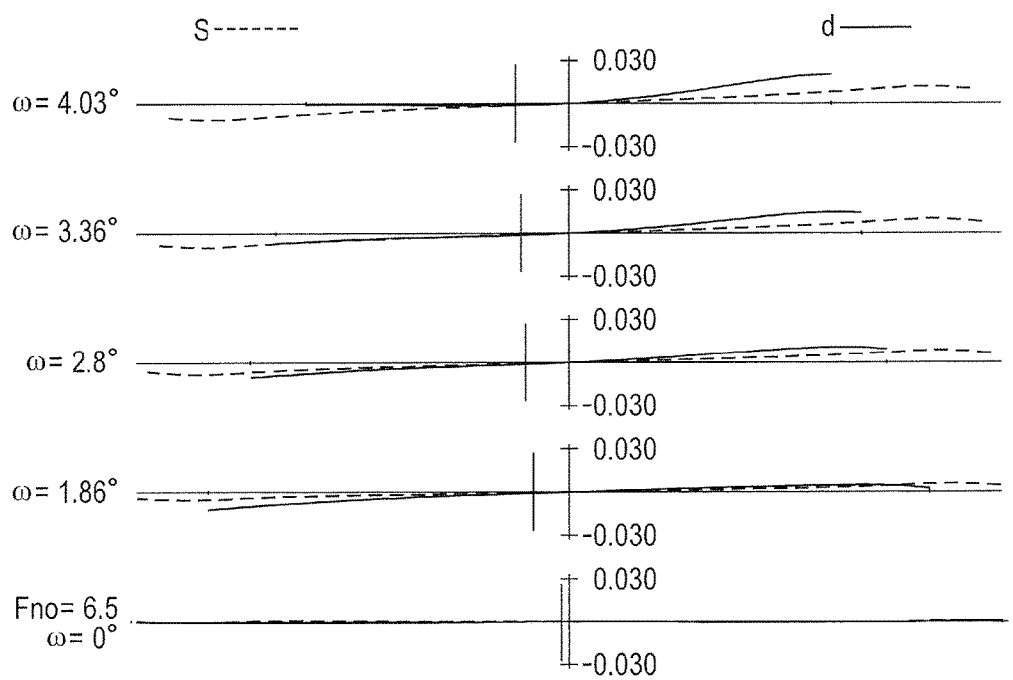
FIG. 4B is lateral aberration diagrams of the zoom lens at the telephoto end when the image stabilization is performed with the second lens unit B2 according to Example 1 of the present invention.
Figure 5A:
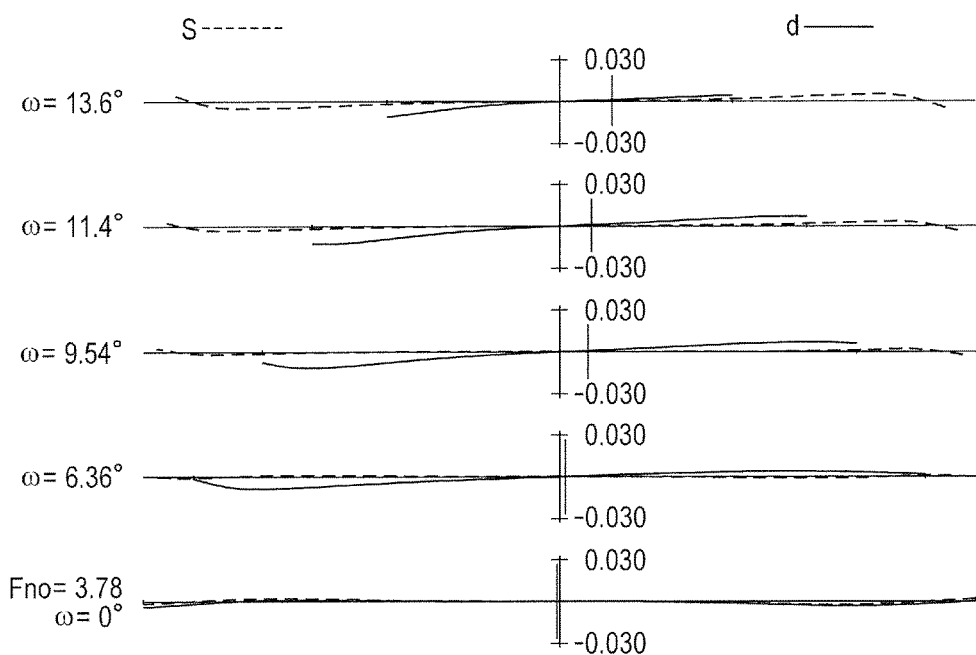
FIG. 5A is lateral aberration diagrams of the zoom lens at the wide angle end when the image stabilization is performed with a second lens sub-unit B3$b$ according to Example 1 of the present invention.
Figure 5B:
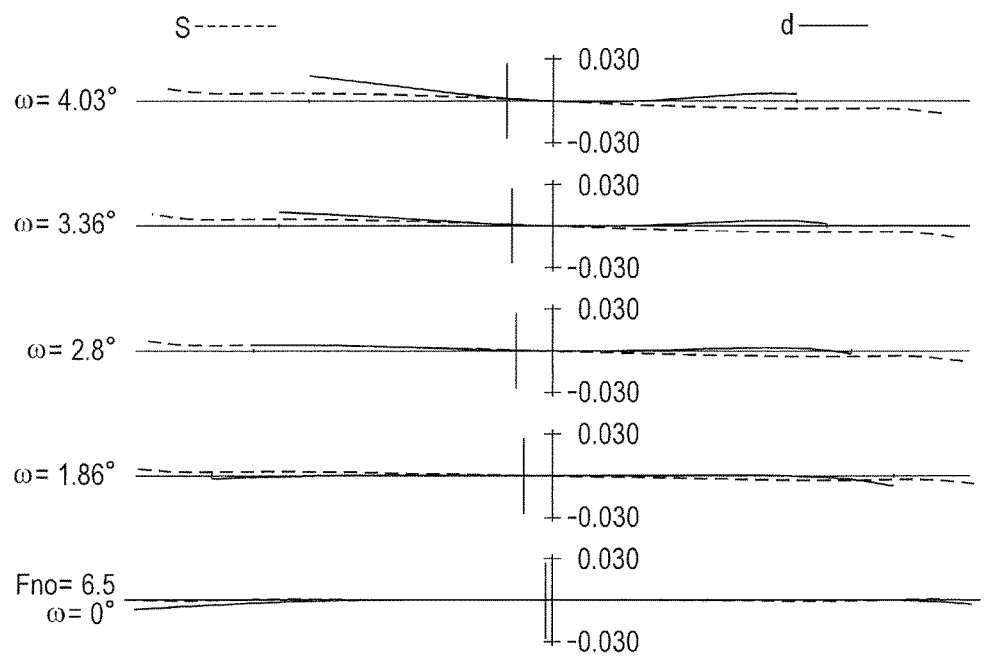
FIG. 5B is lateral aberration diagrams of the zoom lens at the telephoto end when the image stabilization is performed with the second lens sub-unit B3$b$ according to Example 1 of the present invention.

FIG. 4A and FIG. 4B are lateral aberration diagrams of cases where an image stabilization angle of 0.4° is achieved by only changing the first image stabilizing unit IS1 at the wide angle end and the telephoto end, respectively. Further, FIG. 5A and FIG. 5B are lateral aberration diagrams of cases where the image stabilization angle of 0.4° is achieved by only changing the second image stabilizing unit IS2 at the wide angle end and the telephoto end, respectively.

As shown in FIG. 4A, FIG. 4B, FIG. 5A, and FIG. 5B, in the zoom lens of Example 1, each of the image stabilizing units, that is, the first image stabilizing unit IS1 and the second image stabilizing unit IS2, independently has a satisfactory image stabilization function, and hence the generation of aberration (decentering aberration) is reduced even when the image stabilization angle of 0.4° is achieved.

Figure 6A:
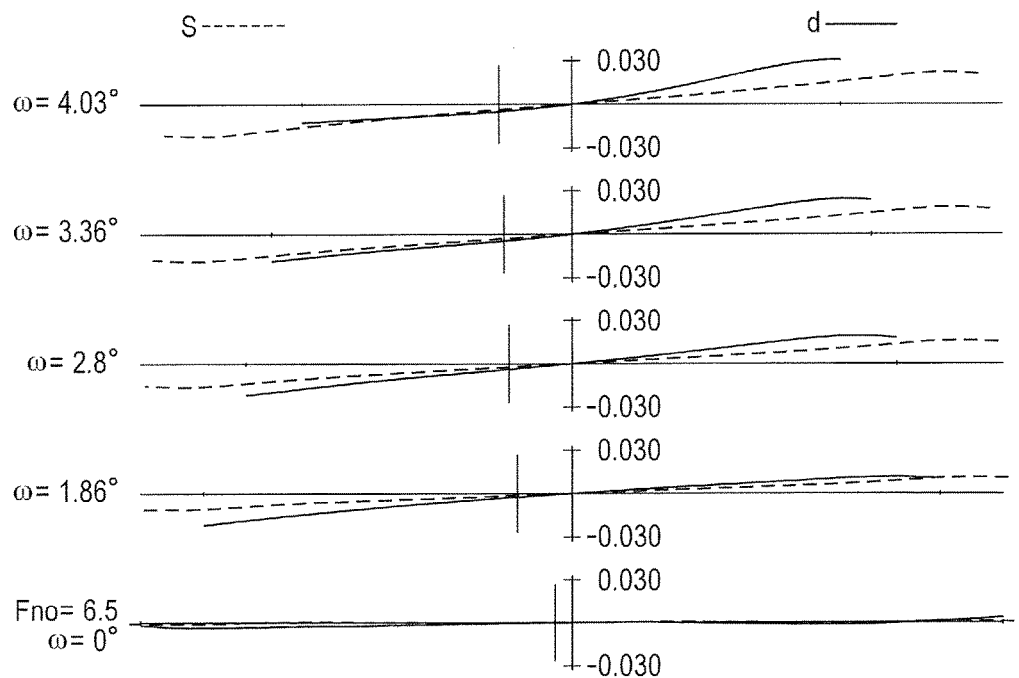
FIG. 6A is lateral aberration diagrams of the zoom lens at the telephoto end when an image stabilization angle is increased with the second lens unit B2 according to Example 1 of the present invention.
Figure 6B:
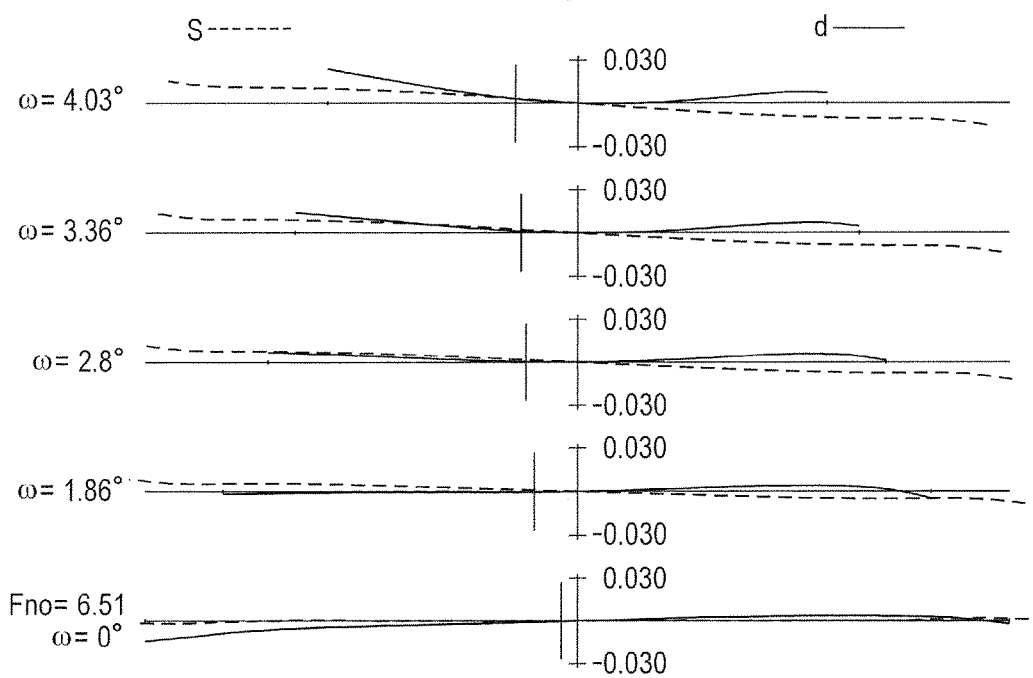
FIG. 6B is lateral aberration diagrams of the zoom lens at the telephoto end when the image stabilization angle is increased with the second lens sub-unit B3$b$ according to Example 1 of the present invention.

However, image quality is degraded when the image stabilization angle is further increased by only using the one image stabilizing unit. The details are as follows. FIG. 6A is lateral aberration diagrams of a case where an image stabilization angle of 0.8° is achieved by only changing the first image stabilizing unit IS1 at the telephoto end, and FIG. 6B is lateral aberration diagrams of a case where the image stabilization angle of 0.8° is achieved by only changing the second image stabilizing unit IS2 at the telephoto end. As seen from FIG. 6A and FIG. 6B, when the image stabilization angle of 0.8° is achieved with only the one image stabilizing unit, decentering field curvature and astigmatism conspicuously appear, and the optical characteristics are deteriorated in a periphery.

In the zoom lens of the present invention, which includes the two image stabilizing units, namely, the first image stabilizing unit IS1 and the second image stabilizing unit IS2, the first image stabilizing unit IS1 and the second image stabilizing unit IS2 are decentered independently of each other such that the image stabilization angle is easily increased.

FIG. 7 is lateral aberration diagrams of a case where the image stabilization angle of 0.8° is achieved by decentering both of the first image stabilizing unit IS1 and the second image stabilizing unit IS2 in the direction perpendicular to the optical axis at the telephoto end. An image stabilization angle of substantially 0.4° is achieved by the first image stabilizing unit IS1 and an image stabilization angle of substantially 0.4° is achieved by the second image stabilizing unit IS2. The image stabilization angles of the two image stabilizing units are combined to achieve the image stabilization angle of 0.8°. In this case, the first image stabilizing unit IS1 and the second image stabilizing unit IS2 are decentered in the same direction, namely, the direction perpendicular to the optical axis. The image stabilizing units are decentered in the same direction so that the image stabilization angles may be combined (larger image stabilization angle may be achieved).

As seen from FIG. 7, as a result of simultaneously using the two image stabilizing units to perform image stabilization, satisfactory optical characteristics are provided even when the image stabilization angle is increased.

In Example 1, as shown in FIG. 6A and FIG. 6B, field curvature that is generated when the first image stabilizing unit IS1 is decentered, and field curvature that is generated when the second image stabilizing unit IS2 is decentered in the same direction as the first image stabilizing unit IS1 have a relationship of correcting each other. Thus, the two image stabilizing units having negative refractive powers simultaneously perform image stabilization such that satisfactory optical characteristics are maintained even when the image stabilization angle is large.

Example 2

The zoom lens of Example 2 illustrated in FIG. 8A and FIG. 8B is described. The zoom lens of Example 2 has the following lens configuration in which the lens units are arranged in order from the object side to the image side. The zoom lens of Example 2 includes the first lens unit B1 having a positive refractive power, the second lens unit B2 having a negative refractive power, the third lens unit B3 having a positive refractive power, and the rear lens group LR. The rear lens group LR consists of, in order from the object side to the image side, the fourth lens unit B4 having a positive refractive power, the fifth lens unit B5 having a negative refractive power, and a sixth lens unit B6 having a positive refractive power. An interval between each pair of adjacent lens units is changed during zooming. The second lens unit B2 is configured not to move during zooming.

All of the lens units except for the second lens unit B2 are configured to move toward the object side along loci different from each other during zooming from the wide angle end to the telephoto end. An interval between the first lens unit B1 and the second lens unit B2 is larger at the telephoto end than at the wide angle end, an interval between the second lens unit B2 and the third lens unit B3 is smaller at the telephoto end than at the wide angle end, and an interval between the third lens unit B3 and the fourth lens unit B4 is larger at the telephoto end than at the wide angle end. In addition, an interval between the fourth lens unit B4 and the fifth lens unit B5 is larger at the telephoto end than at the wide angle end, and an interval between the fifth lens unit B5 and the sixth lens unit B6 is smaller at the telephoto end than at the wide angle end. Focusing is performed with the first lens unit B1.

Figure 9A:
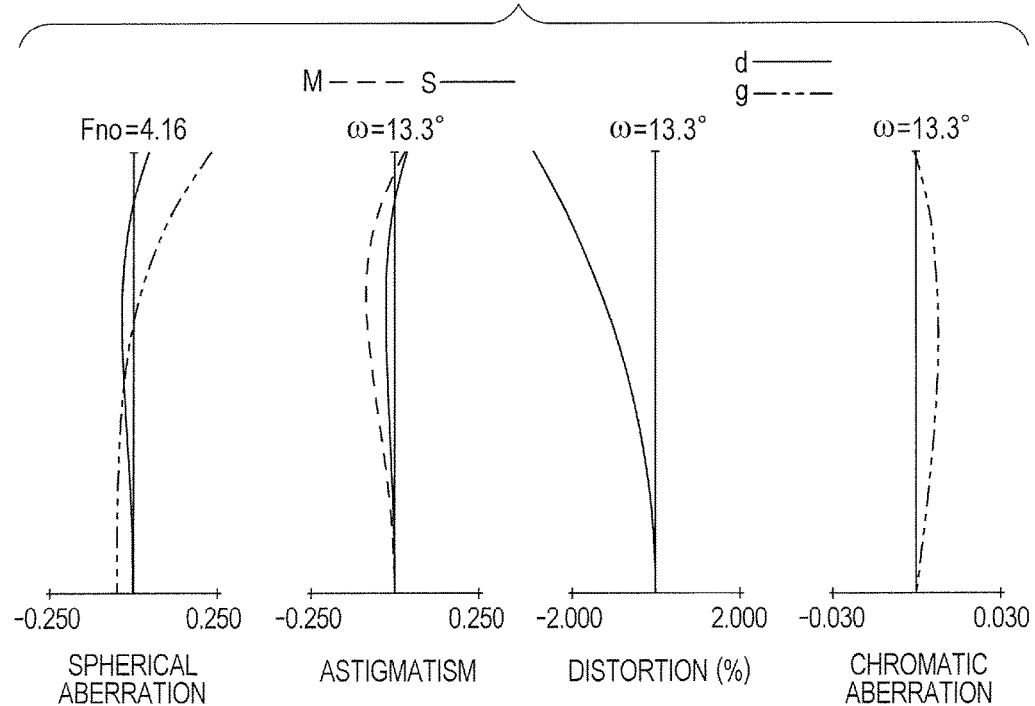
FIG. 9A is longitudinal aberration diagrams of the zoom lens at the wide angle end according to Example 2 of the present invention.
Figure 9B:
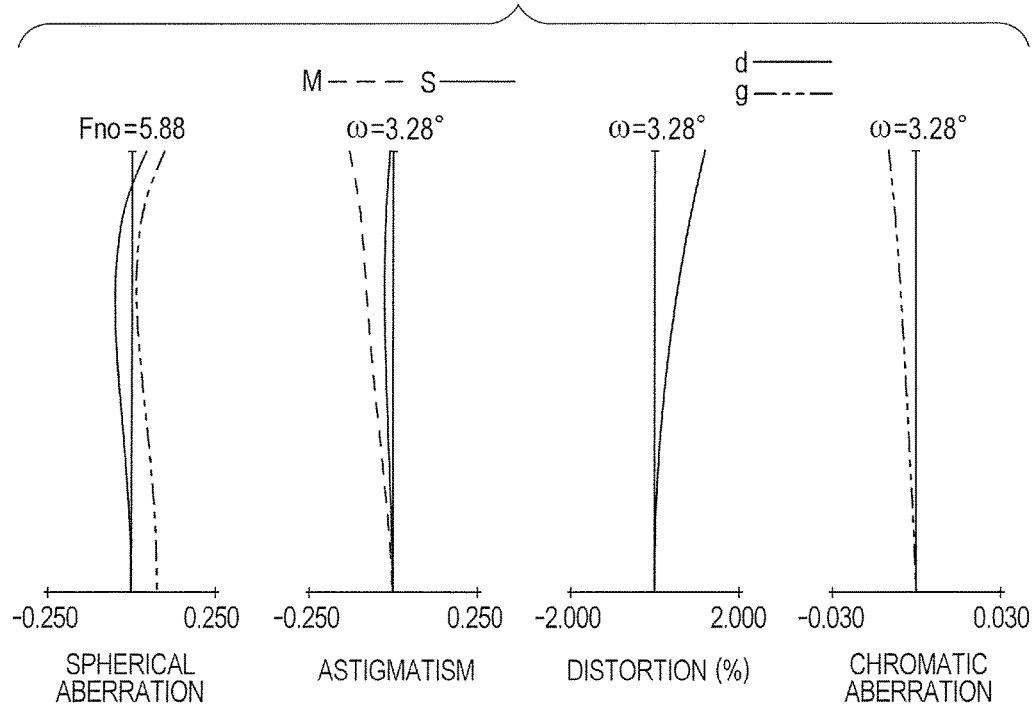
FIG. 9B is longitudinal aberration diagrams of the zoom lens at the telephoto end according to Example 2 of the present invention.
Figure 10A:
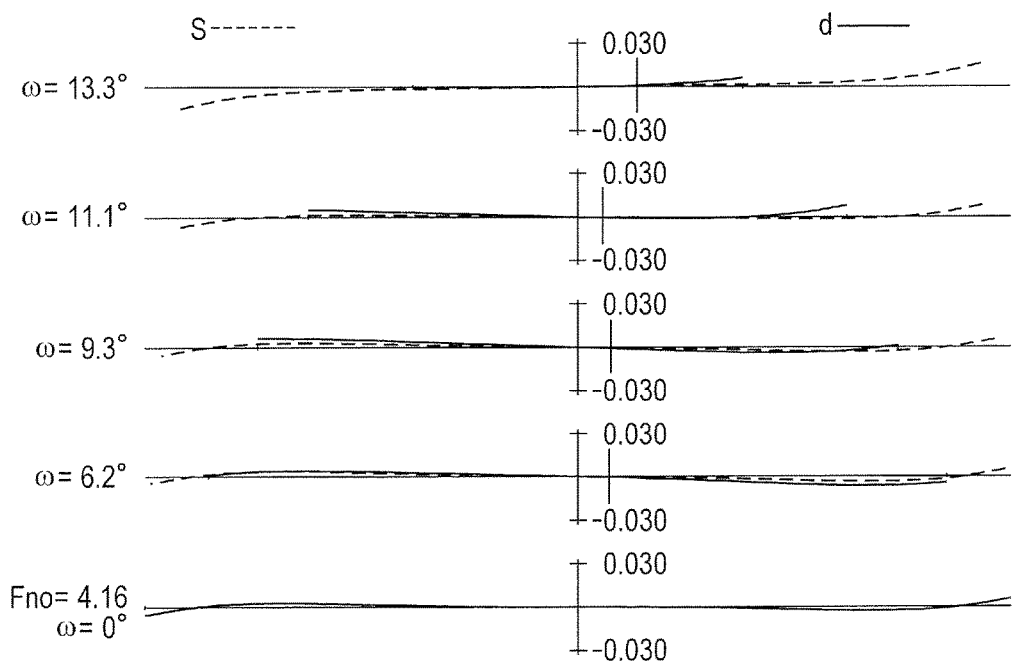
FIG. 10A is lateral aberration diagrams of the zoom lens at the wide angle end according to Example 2 of the present invention.
Figure 10B:
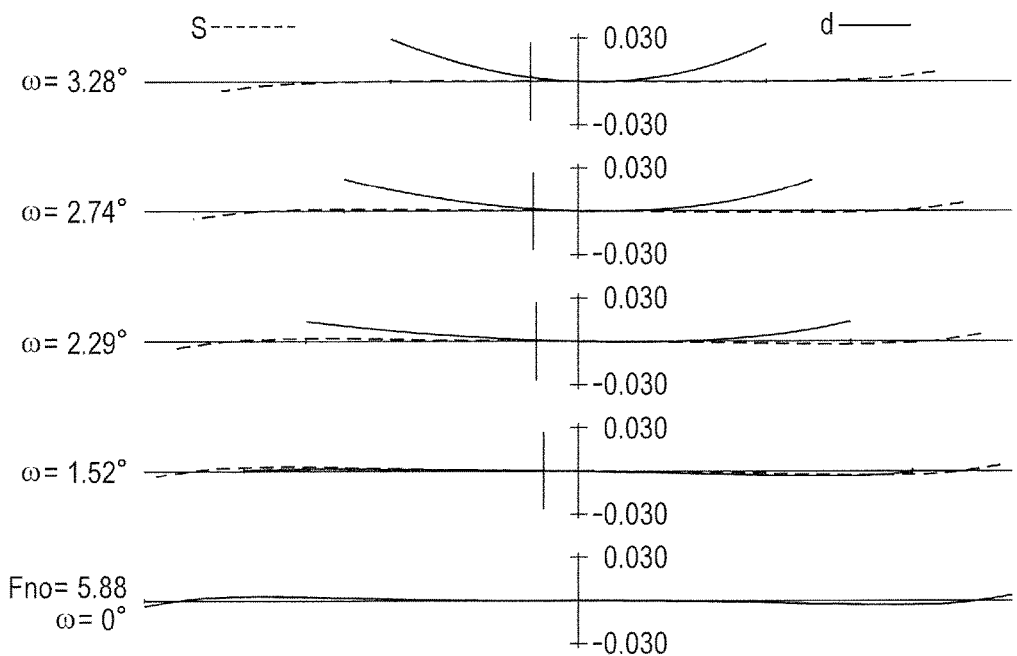
FIG. 10B is lateral aberration diagrams of the zoom lens at the telephoto end according to Example 2 of the present invention.

FIG. 9A and FIG. 9B are longitudinal aberration diagrams of the zoom lens at the wide angle end and the telephoto end, respectively according to Example 2 of the present invention. FIG. 10A and FIG. 10B are lateral aberration diagrams of the zoom lens at the wide angle end and the telephoto end, respectively according to Example 2 of the present invention. As shown in FIG. 9A, FIG. 9B, FIG. 10A, and FIG. 10B, the zoom lens of Example 2 has satisfactory optical characteristics also when image stabilization is not performed.

Figure 11A:
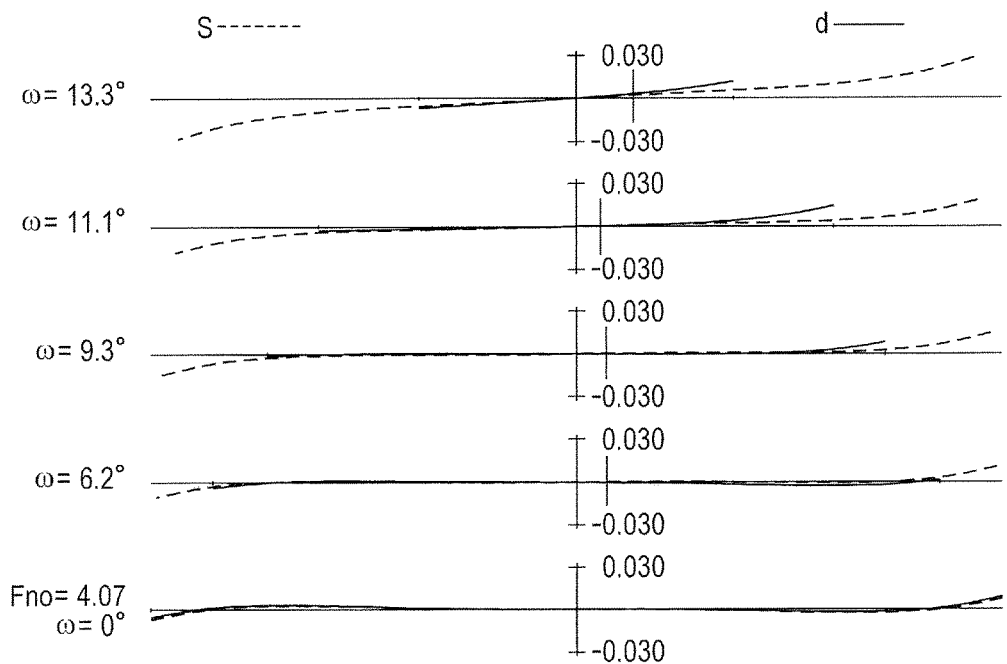
FIG. 11A is lateral aberration diagrams of the zoom lens at the wide angle end when the image stabilization is performed with a second lens unit B2 according to Example 2 of the present invention.
Figure 11B:
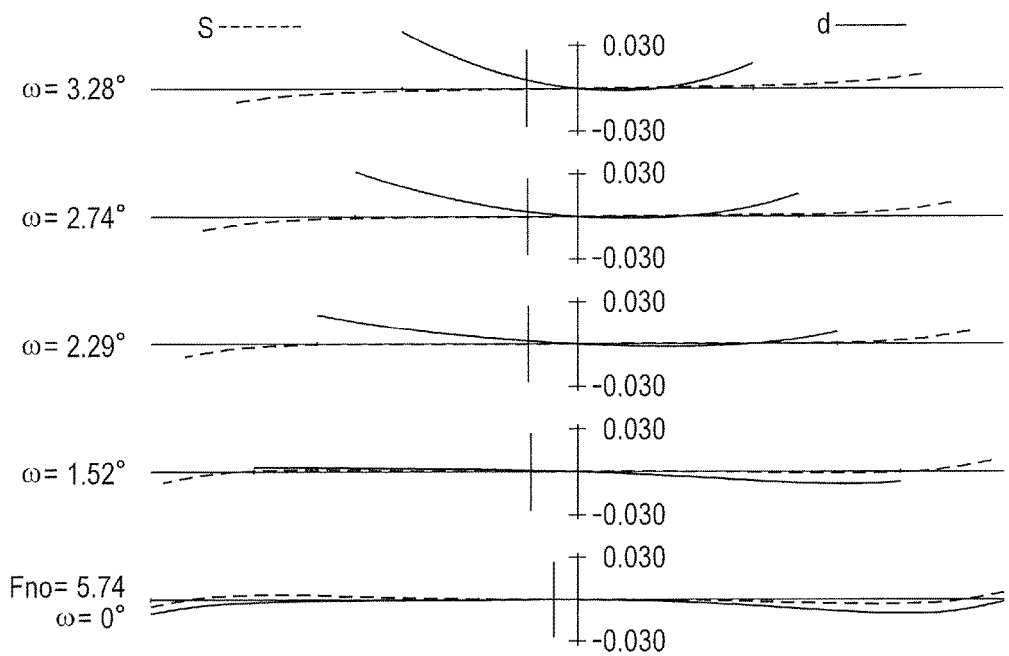
FIG. 11B is lateral aberration diagrams of the zoom lens at the telephoto end when the image stabilization is performed with the second lens unit B2 according to Example 2 of the present invention.
Figure 12A:
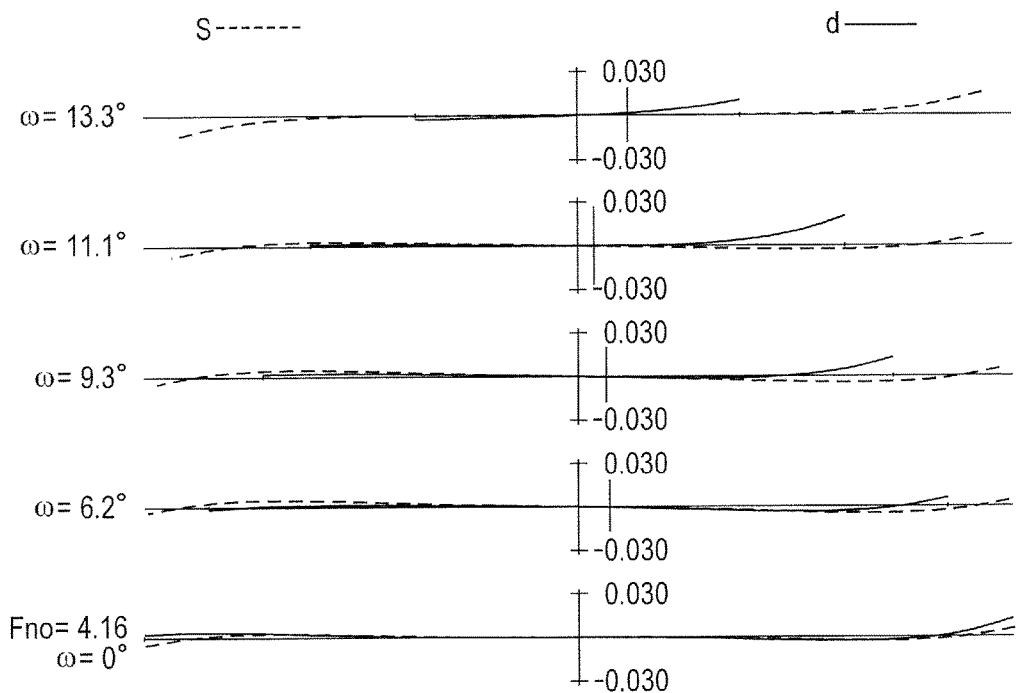
FIG. 12A is lateral aberration diagrams of the zoom lens at the wide angle end when the image stabilization is performed with a fifth lens unit B5 according to Example 2 of the present invention.
Figure 12B:
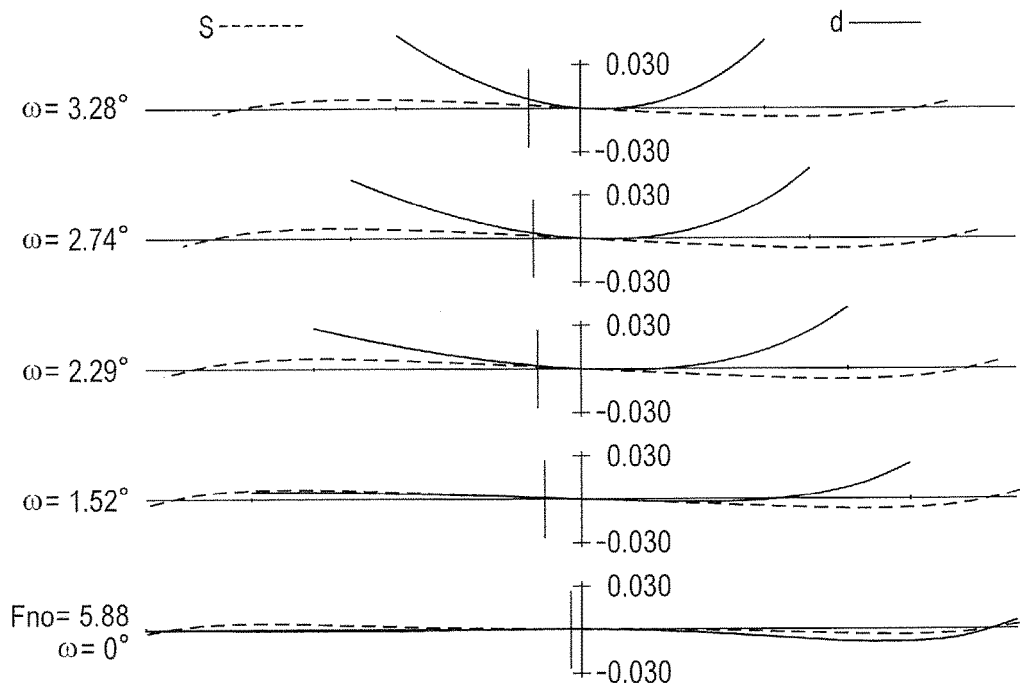
FIG. 12B is lateral aberration diagrams of the zoom lens at the telephoto end when the image stabilization is performed with the fifth lens unit B5 according to Example 2 of the present invention.

In Example 2, the second lens unit B2 serves as the first image stabilizing unit IS1, and the fifth lens unit B5 serves as the second image stabilizing unit IS2. FIG. 11A and FIG. 11B are lateral aberration diagrams of cases where an image stabilization angle of 0.4° is achieved by only changing the first image stabilizing unit IS1 at the wide angle end and the telephoto end, respectively. Further, FIG. 12A and FIG. 12B are lateral aberration diagrams of cases where the image stabilization angle of 0.4° is achieved by only changing the second image stabilizing unit IS2 at the wide angle end and the telephoto end, respectively.

As shown in FIG. 11A, FIG. 11B, FIG. 12A, and FIG. 12B, in the zoom lens of Example 2, each of the image stabilizing units, that is, the first image stabilizing unit IS1 and the second image stabilizing unit IS2, independently has a satisfactory image stabilization function, and hence the generation of aberration (decentering aberration) is reduced even when the image stabilization angle of 0.4° is achieved.

Figure 13A:
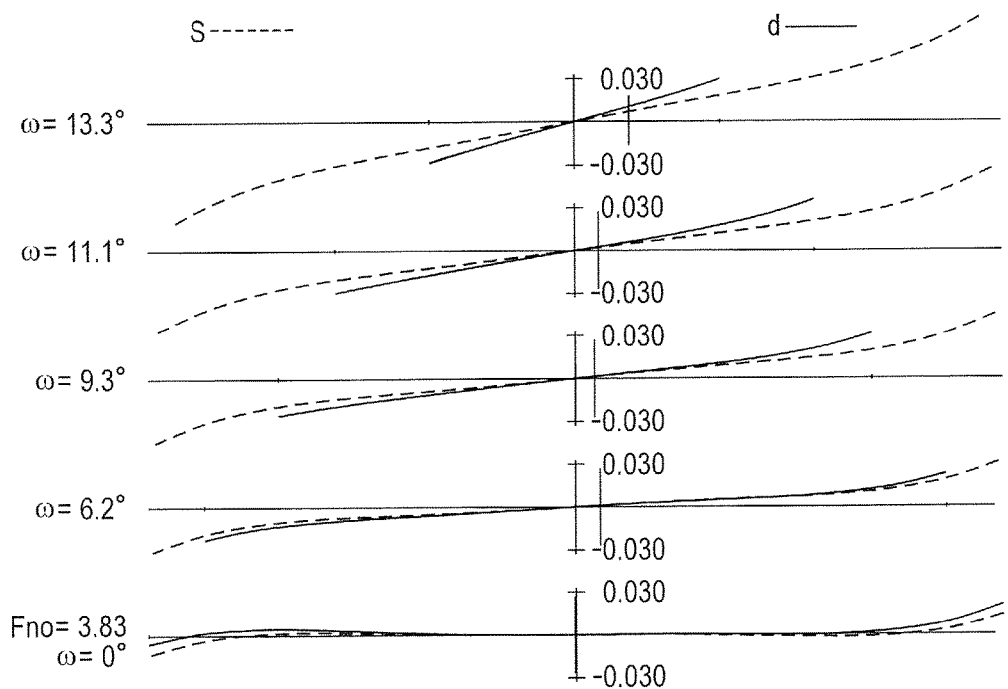
FIG. 13A is lateral aberration diagrams of the zoom lens at the telephoto end when the image stabilization angle is increased with the second lens unit B2 according to Example 2 of the present invention.
Figure 13B:
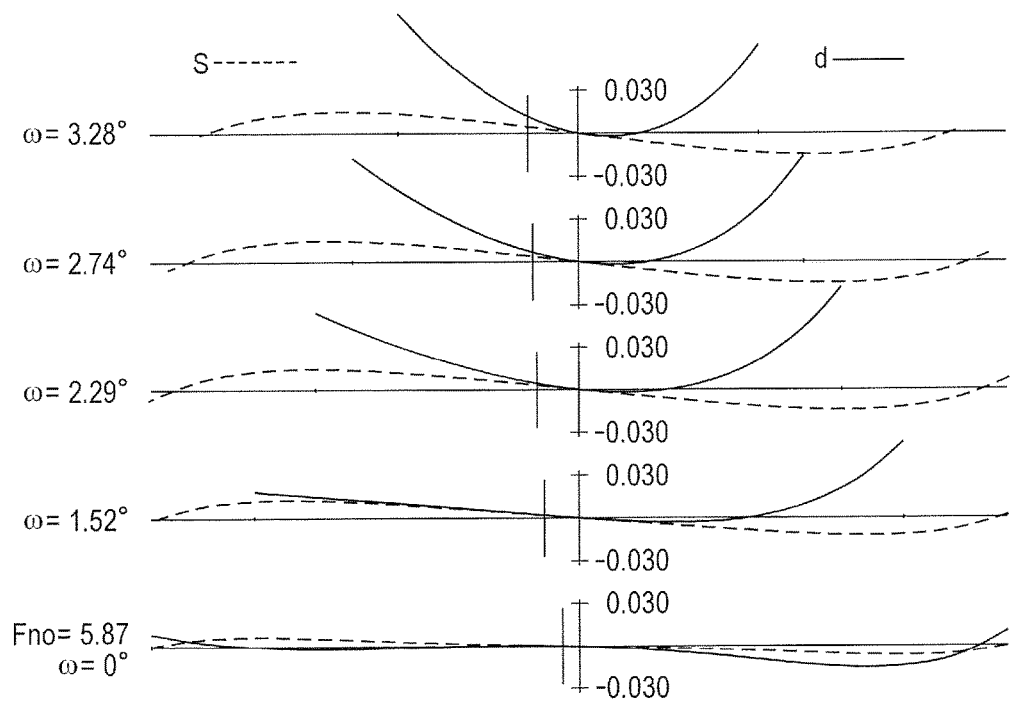
FIG. 13B is lateral aberration diagrams of the zoom lens at the telephoto end when the image stabilization angle is increased with the fifth lens unit B5 according to Example 2 of the present invention.

However, image quality is degraded when the image stabilization angle is further increased by only using the one image stabilizing unit. The details are as follows. FIG. 13A is lateral aberration diagrams of a case where an image stabilization angle of 0.8° is achieved by only changing the first image stabilizing unit IS1 at the telephoto end, and FIG. 13B is lateral aberration diagrams of a case where the image stabilization angle of 0.8° is achieved by only changing the second image stabilizing unit IS2 at the telephoto end. As seen from FIG. 13A and FIG. 13B, when the image stabilization angle of 0.8° is achieved with only the one image stabilizing unit, decentering field curvature, astigmatism, and decentering coma conspicuously appear, and the optical characteristics are deteriorated in a periphery.

Also in the zoom lens of Example 2, the first image stabilizing unit IS1 and the second image stabilizing unit IS2 are decentered independently of each other so that the image stabilization angle may be increased.

Figure 14:
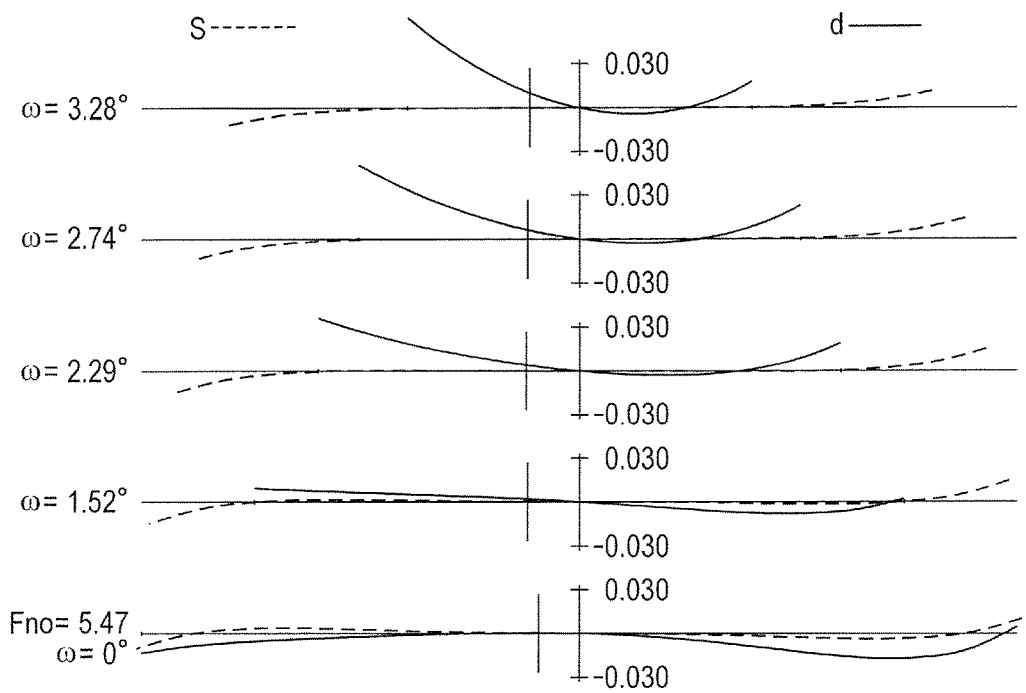
FIG. 14 is lateral aberration diagrams of the zoom lens at the telephoto end when the image stabilization is performed with both of the second lens unit B2 and the fifth lens unit B5 according to Example 2 of the present invention.
Figure 15:
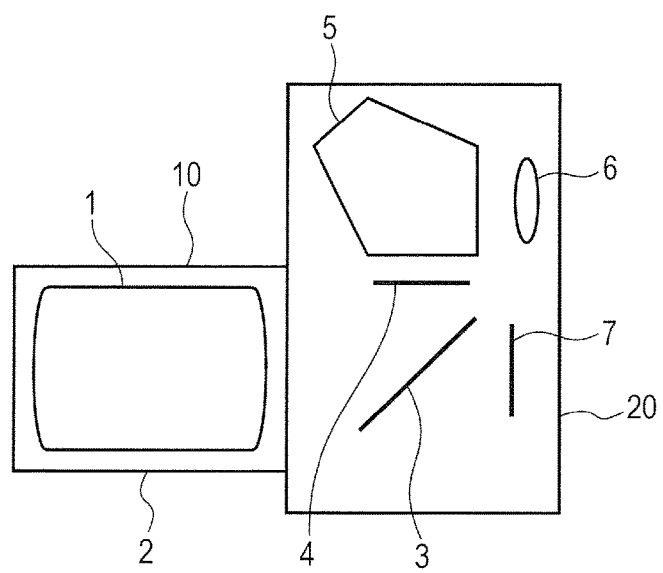
FIG. 15 is a schematic view of a main part of an image pickup apparatus including the zoom lens of the present invention.

FIG. 14 is lateral aberration diagrams of a case where the image stabilization angle of 0.8° is achieved by decentering both of the first image stabilizing unit IS1 and the second image stabilizing unit IS2 in the direction perpendicular to the optical axis at the telephoto end. An image stabilization angle of substantially 0.65° is achieved by the first image stabilizing unit IS1 and an image stabilization angle of substantially 0.15° is achieved by the second image stabilizing unit IS2. The image stabilization angles of the two image stabilizing units are combined to achieve the image stabilization angle of 0.8°.

In this case, the first image stabilizing unit IS1 and the second image stabilizing unit IS2 are decentered in the same direction, namely, the direction perpendicular to the optical axis. The image stabilizing units are decentered in the same direction so that the image stabilization angles may be combined (larger image stabilization angle may be achieved). As seen from FIG. 14, as a result of simultaneously using the two image stabilizing units to perform image stabilization, satisfactory optical characteristics are provided even when the image stabilization angle is increased.

FIG. 15 is a schematic view of a main part of a single-lens reflex camera (image pickup apparatus) including the zoom lens of the present invention. In FIG. 15, a lens barrel 10 includes a zoom lens 1 of Example 1 or 2.

The zoom lens 1 is held by a lens barrel 2, which serves as a holding member. A camera main body 20 includes a quick return mirror 3, a focus plate 4, a penta roof prism 5, an eyepiece lens 6, and other such components. The quick return mirror 3 is configured to reflect a light beam from the zoom lens 1 upward. The focus plate 4 is arranged at an image forming position of the zoom lens 1. The penta roof prism 5 is configured to convert a reverse image formed on the focus plate 4 into an erect image. An observer observes the erect image via the eyepiece lens 6.

As a photosensitive plane 7, there is arranged a solid-state image pickup element (photo-electric conversion element), for example, a CCD sensor or a CMOS sensor configured to receive an image, or a silver-halide film. When an image is taken, the quick return mirror 3 is retracted from an optical path, and an image is formed on the photosensitive plane 7 by the zoom lens 1. In this way, through application of the zoom lens 1 of the present invention to an image pickup apparatus, for example a single-lens reflex camera, high optical characteristics are obtained.

The zoom lens of the present invention may be applied not only to a digital camera, a video camera, or a silver-halide film camera but also to optical equipment, for example, a telescope, binoculars, a copying machine, or a projector. Further, the zoom lens of the present invention may be applied to a mirrorless single-lens reflex camera (mirrorless camera) including no quick return mirror. Consequently, as described above, according to each Example, there may be provided a zoom lens having excellent optical characteristics when image stabilization is not performed, and having excellent optical characteristics even under a state in which an image stabilization angle is large.

The exemplary embodiments of the present invention are described above, but the present invention is not limited to those embodiments and may be modified and changed variously within the gist thereof.

In the following, Numerical Data 1 and Numerical Data 2 respectively corresponding to Examples 1 and 2 are shown. In each Numerical Data, the order of a surface counted from the object side is represented by i, a curvature radius of an i-th surface is represented by ri, an interval between the i-th surface and an (i+1)th surface is represented by di, and a refractive index and an Abbe number of a material of a lens between the i-th surface and the (i+1)th surface with the d-line being reference are represented by ndi and vdi, respectively. The units of ri and di are both in millimeters. A back focus is represented by BF. A lens total length refers to a distance from the first lens surface to the image plane.

In addition, an aspheric surface is indicated by a suffix "*" of the surface number. An aspheric surface shape is expressed by the following expression:

$$X(h) = \frac{(1/r)h^2}{1 + \sqrt{\{1 - (1+K)(h/r)^2\}}} + B \cdot h^4 + C \cdot h^6 + D \cdot h^8 + E \cdot h^{10}$$

where X represents an amount of displacement from a surface vertex in the optical axis direction, h represents a height from the optical axis in the direction perpendicular to the optical axis, r represents a paraxial curvature radius, K represents a conic constant, and B, C, D, and E represent aspheric coefficients of individual orders.

"e±XX" in each aspheric coefficient means "×10$^{\pm XX}$". Further, values relating to the individual conditional expressions described above are shown in Table 1.

[Numerical Data 1]

| Unit mm | | | | |
|---|---|---|---|---|
| Surface data | | | | |

| Surface number | r | d | nd | vd | Effective diameter |
|---|---|---|---|---|---|
| 1 | 68.382 | 3.10 | 1.48749 | 70.2 | 29.85 |
| 2 | 184.452 | 0.20 | | | 29.55 |
| 3 | 87.017 | 1.50 | 1.72047 | 34.7 | 29.43 |
| 4 | 43.783 | 5.30 | 1.48749 | 70.2 | 28.83 |
| 5 | −207.658 | (Variable) | | | 28.47 |
| 6 | −92.700 | 0.90 | 1.69350 | 50.8 | 18.81 |
| 7 | 20.215 | 2.80 | 1.80809 | 22.8 | 18.49 |
| 8 | 51.908 | 1.99 | | | 18.29 |
| 9 | −41.117 | 0.90 | 1.80400 | 46.6 | 18.29 |
| 10 | 1367.687 | (Variable) | | | 18.71 |
| 11 | 20.229 | 4.37 | 1.57099 | 50.8 | 20.32 |
| 12 | −222.747 | 0.50 | | | 20.07 |
| 13 | 16.872 | 4.52 | 1.49700 | 81.5 | 18.85 |
| 14 | −306.488 | 0.90 | 1.84666 | 23.8 | 17.86 |
| 15 | 27.205 | 2.81 | | | 16.68 |
| 16 (Stop) | ∞ | 2.53 | | | 16.10 |
| 17* | 54.427 | 2.00 | 1.58313 | 59.4 | 14.93 |
| 18* | 160.134 | 1.50 | | | 14.25 |
| 19 | −138.752 | 1.82 | 1.80610 | 33.3 | 13.98 |
| 20 | −25.017 | 0.80 | 1.69680 | 55.5 | 13.85 |
| 21 | 30.284 | 1.82 | | | 13.44 |
| 22 | 19.262 | 4.16 | 1.48749 | 70.2 | 13.52 |
| 23 | −45.399 | (Variable) | | | 12.97 |
| 24 | 186.197 | 0.60 | 1.69680 | 55.5 | 11.98 |
| 25 | 13.287 | 2.00 | 1.54072 | 47.2 | 11.42 |
| 26 | 39.121 | 19.10 | | | 11.15 |
| 27 | −32.141 | 3.30 | 1.80610 | 33.3 | 18.52 |
| 28 | −18.391 | 1.00 | 1.48749 | 70.2 | 19.51 |
| 29 | 279.850 | (Variable) | | | 21.07 |
| Image plane | ∞ | | | | |

| Aspherical surface data |
|---|

Seventeenth surface

K = 0.00000e+000 A4 = −3.16609e−005 A6 = 3.39904e−007
A8 = 4.73860e−009 A10 = −4.98257e−011

Eighteenth surface

K = 0.00000e+000 A4 = 5.67745e−005 A6 = 6.21973e−007
A8 = 6.27275e−009 A10 = −4.26978e−011

| Various data Zoom ratio 3.43 | | | |
|---|---|---|---|
| | Wide angle | Intermediate | Telephoto |
| Focal length | 56.50 | 125.64 | 194.01 |
| F-number | 3.78 | 5.24 | 6.50 |
| Half angle of view (degree) | 13.59 | 6.21 | 4.03 |
| Image height | 13.66 | 13.66 | 13.66 |
| Total lens length | 103.50 | 126.75 | 150.00 |
| d5 | 3.86 | 23.48 | 32.68 |
| d10 | 15.12 | 3.64 | 1.27 |
| d23 | 4.09 | 5.48 | 1.50 |
| d29 (BF) | 10.00 | 23.73 | 44.13 |

| Zoom lens unit data | | | | | |
|---|---|---|---|---|---|
| Unit | First surface | Focal length | Lens structure length | Front principal point position | Rear principal point position |
| 1 | 1 | 102.90 | 10.10 | 1.28 | −5.51 |
| 2 | 6 | −26.01 | 6.59 | 2.93 | −1.57 |
| 3 | 11 | 26.07 | 17.63 | −0.53 | −13.79 |
| 4 | 19 | −40.69 | 2.62 | 1.20 | −0.27 |
| 5 | 22 | 28.34 | 4.16 | 0.85 | −2.01 |
| 6 | 24 | −45.59 | 2.60 | 1.23 | −0.41 |
| 7 | 27 | −113.74 | 4.30 | −3.11 | −5.74 |

[Numerical Data 2]

| Unit mm | | | | |
|---|---|---|---|---|
| Surface data | | | | |

| Surface number | r | d | nd | vd | Effective diameter |
|---|---|---|---|---|---|
| 1 | 75.574 | 4.71 | 1.48749 | 70.2 | 41.04 |
| 2 | −553.304 | 0.15 | | | 40.56 |
| 3 | 93.333 | 1.70 | 1.65412 | 39.7 | 39.39 |
| 4 | 36.686 | 6.86 | 1.48749 | 70.2 | 37.68 |
| 5 | 209.042 | (Variable) | | | 37.01 |
| 6 | −304.867 | 0.80 | 1.71300 | 53.9 | 18.29 |
| 7 | 18.724 | 2.72 | 1.80809 | 22.8 | 17.79 |
| 8 | 45.113 | 2.10 | | | 17.52 |
| 9 | −35.845 | 0.80 | 1.77077 | 49.9 | 17.52 |
| 10 | 410.714 | (Variable) | | | 17.89 |
| 11 | 59.413 | 3.45 | 1.76385 | 48.5 | 21.66 |
| 12 | −61.689 | 0.30 | | | 21.72 |
| 13 | 35.134 | 4.12 | 1.49700 | 81.5 | 21.11 |
| 14 | −51.421 | 1.12 | 1.90366 | 31.3 | 20.61 |
| 15 | 213.538 | 4.48 | | | 20.18 |
| 16 (Stop) | ∞ | (Variable) | | | 19.11 |
| 17 | −131.955 | 1.00 | 1.80000 | 29.8 | 14.08 |
| 18 | 18.294 | 4.00 | 1.51742 | 52.4 | 14.35 |

-continued

Unit mm

| | | | | | |
|---|---|---|---|---|---|
| 19 | −69.004 | 1.00 | | | 15.11 |
| 20 | 28.751 | 2.86 | 1.83400 | 37.2 | 16.23 |
| 21 | 107.786 | (Variable) | | | 16.14 |
| 22 | −31.013 | 2.18 | 1.90366 | 31.3 | 16.43 |
| 23 | −23.840 | 1.70 | | | 16.91 |
| 24 | −25.459 | 0.70 | 1.48749 | 70.2 | 16.64 |
| 25 | 35.530 | (Variable) | | | 17.05 |
| 26 | 66.834 | 2.38 | 1.83602 | 39.7 | 20.49 |
| 27 | −288.201 | (Variable) | | | 20.63 |
| Image plane | ∞ | | | | |

Various data
Zoom ratio 4.10

| | Wide angle | Intermediate | Telephoto |
|---|---|---|---|
| Focal length | 58.01 | 133.70 | 238.00 |
| F-number | 4.16 | 5.09 | 5.88 |
| Half angle of view (degree) | 13.25 | 5.83 | 3.28 |
| Image height | 13.66 | 13.66 | 13.66 |
| Total lens length | 155.88 | 193.28 | 210.88 |
| d5 | 5.87 | 43.27 | 60.87 |
| d10 | 24.92 | 11.49 | 1.49 |
| d16 | 19.96 | 21.96 | 26.58 |
| d21 | 4.10 | 8.13 | 8.16 |
| d25 | 11.86 | 7.83 | 7.80 |
| d27 (BF) | 40.04 | 51.47 | 56.85 |

Zoom lens unit data

| Unit | First surface | Focal length | Lens structure length | Front principal point position | Rear principal point position |
|---|---|---|---|---|---|
| 1 | 1 | 130.71 | 13.42 | −1.87 | −10.62 |
| 2 | 6 | −25.52 | 6.42 | 3.33 | −1.16 |
| 3 | 11 | 35.42 | 13.47 | −0.18 | −10.06 |
| 4 | 17 | 105.90 | 8.87 | 10.01 | 4.93 |
| 5 | 22 | −42.67 | 4.57 | 2.31 | −0.88 |
| 6 | 26 | 65.09 | 2.38 | 0.25 | −1.06 |

TABLE 1

| Conditional Expression | | Example 1 | Example 2 |
|---|---|---|---|
| (1X) | D1t/fT | 0.55 | 0.57 |
| (1Y) | D2t/fT | 0.41 | 0.30 |
| (2X) | |fIS1/fT| | 0.134 | 0.107 |
| (2Y) | |fIS2/fT| | 0.210 | 0.179 |
| (3X) | |fIS1f/fT| | 0.53 | 0.55 |
| (3Y) | |fIS2f/fT| | 0.48 | 0.67 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-043134, filed Mar. 7, 2016, which is hereby incorporated by reference herein in its entirety.

What is claimed is:

1. A zoom lens, comprising, in order from an object side to an image side:
a first lens unit having a positive refractive power;
a second lens unit having a negative refractive power;
a third lens unit having a positive refractive power; and
a rear lens group including one or more lens units,
wherein an interval between each pair of adjacent lens units is changed during zooming,
wherein an interval between the first lens unit and the second lens unit is larger at a telephoto end than at a wide angle end, and an interval between the second lens unit and the third lens unit is smaller at the telephoto end than at the wide angle end,
wherein one of the entire second lens unit and a lens sub-unit having a negative refractive power, which corresponds to a part of the second lens unit, serves as a first image stabilizing unit configured to move during image blur correction in a direction having a component in a direction perpendicular to an optical axis,
wherein one of a lens sub-unit having a negative refractive power, which corresponds to a part of the third lens unit, and a lens unit having a negative refractive power, which is included in the rear lens group, serves as a second image stabilizing unit configured to move during image blur correction in a direction having a component in a direction perpendicular to the optical axis, and
wherein the following conditional expressions are satisfied:

$$0.2 < D1t/fT < 0.65; \text{ and}$$

$$0.2 < D2t/fT < 0.65,$$

where D1t represents a distance from a lens surface closest to the object side of the first image stabilizing unit to an image plane at the telephoto end, D2t represents a distance from a lens surface closest to the object side of the second image stabilizing unit to the image plane at the telephoto end, and fT represents a focal length of the zoom lens at the telephoto end.

2. A zoom lens according to claim 1, wherein the following conditional expression is satisfied:

$$0.05 < |fIS1/fT| < 0.25,$$

where fIS1 represents a focal length of the first image stabilizing unit.

3. A zoom lens according to claim 1, wherein the following conditional expression is satisfied:

$$0.05 < |fIS2/fT| < 0.25,$$

where fIS2 represents a focal length of the second image stabilizing unit.

4. A zoom lens according to claim 1, wherein the following conditional expression is satisfied:

$$|fIS1f/fT| < 2.0,$$

where fIS1f represents a combined focal length of all lens systems arranged on the object side of the first image stabilizing unit at the telephoto end.

5. A zoom lens according to claim 1, wherein the following conditional expression is satisfied:

$$|fIS2f/fT| < 2.0,$$

where fIS2f represents a combined focal length of all lens systems arranged on the object side of the second image stabilizing unit at the telephoto end.

6. A zoom lens according to claim 1, wherein each of the first image stabilizing unit and the second image stabilizing unit consists of one of two lenses and three lenses.

7. A zoom lens according to claim 1, further comprising an aperture stop having a variable aperture diameter, which is arranged between the first image stabilizing unit and the second image stabilizing unit.

8. A zoom lens according to claim 1, wherein the first image stabilizing unit consists of, in order from the object side to the image side, a cemented lens obtained by cementing a negative lens and a positive lens, and a negative lens.

9. A zoom lens according to claim 1, wherein the second image stabilizing unit consists of, in order from the object side to the image side, a positive lens and a negative lens.

10. A zoom lens according to claim 1,
wherein the rear lens group consists of a fourth lens unit having a negative refractive power,
wherein the third lens unit consists of, in order from the object side to the image side, a first lens sub-unit having a positive refractive power, a second lens sub-unit having a negative refractive power, and a third lens sub-unit having a positive refractive power,
wherein the second lens unit serves as the first image stabilizing unit, and
wherein the second lens sub-unit serves as the second image stabilizing unit.

11. A zoom lens according to claim 10, wherein all of the first lens unit, the second lens unit, the third lens unit, and the fourth lens unit are configured to move toward the object side along loci different from each other, during zooming from the wide angle end to the telephoto end.

12. A zoom lens according to claim 1,
wherein the rear lens group consists of, in order from the object side to the image side, a fourth lens unit having a positive refractive power, a fifth lens unit having a negative refractive power, and a sixth lens unit having a positive refractive power,
wherein the second lens unit serves as the first image stabilizing unit, and
wherein the fifth lens unit serves as the second image stabilizing unit.

13. A zoom lens according to claim 12,
wherein the second lens unit is configured not to move during zooming, and
wherein all of the first lens unit, the third lens unit, the fourth lens unit, the fifth lens unit, and the sixth lens unit are configured to move toward the object side along loci different from each other, during zooming from the wide angle end to the telephoto end.

14. An image pickup apparatus, comprising:
a zoom lens; and
an image pickup element configured to receive an image formed by the zoom lens,
the zoom lens comprising, in order from an object side to an image side:
    a first lens unit having a positive refractive power;
    a second lens unit having a negative refractive power;
    a third lens unit having a positive refractive power; and
    a rear lens group including one or more lens units,
wherein an interval between each pair of adjacent lens units is changed during zooming,
wherein an interval between the first lens unit and the second lens unit is larger at a telephoto end than at a wide angle end, and an interval between the second lens unit and the third lens unit is smaller at the telephoto end than at the wide angle end,
wherein one of the entire second lens unit and a lens sub-unit having a negative refractive power, which corresponds to a part of the second lens unit, serves as a first image stabilizing unit configured to move during image blur correction in a direction having a component in a direction perpendicular to an optical axis,
wherein one of a lens sub-unit having a negative refractive power, which corresponds to a part of the third lens unit, and a lens unit having a negative refractive power, which is included in the rear lens group, serves as a second image stabilizing unit configured to move during image blur correction in a direction having a component in a direction perpendicular to the optical axis, and
wherein the following conditional expressions are satisfied:

$0.2 < D1t/fT < 0.65$; and $0.2 < D2t/fT < 0.65$, where $D1t$ represents a distance from a lens surface closest to the object side of the first image stabilizing unit to an image plane at the telephoto end, $D2t$ represents a distance from a lens surface closest to the object side of the second image stabilizing unit to the image plane at the telephoto end, and fT represents a focal length of the zoom lens at the telephoto end.

* * * * *